Patented Oct. 9, 1928.

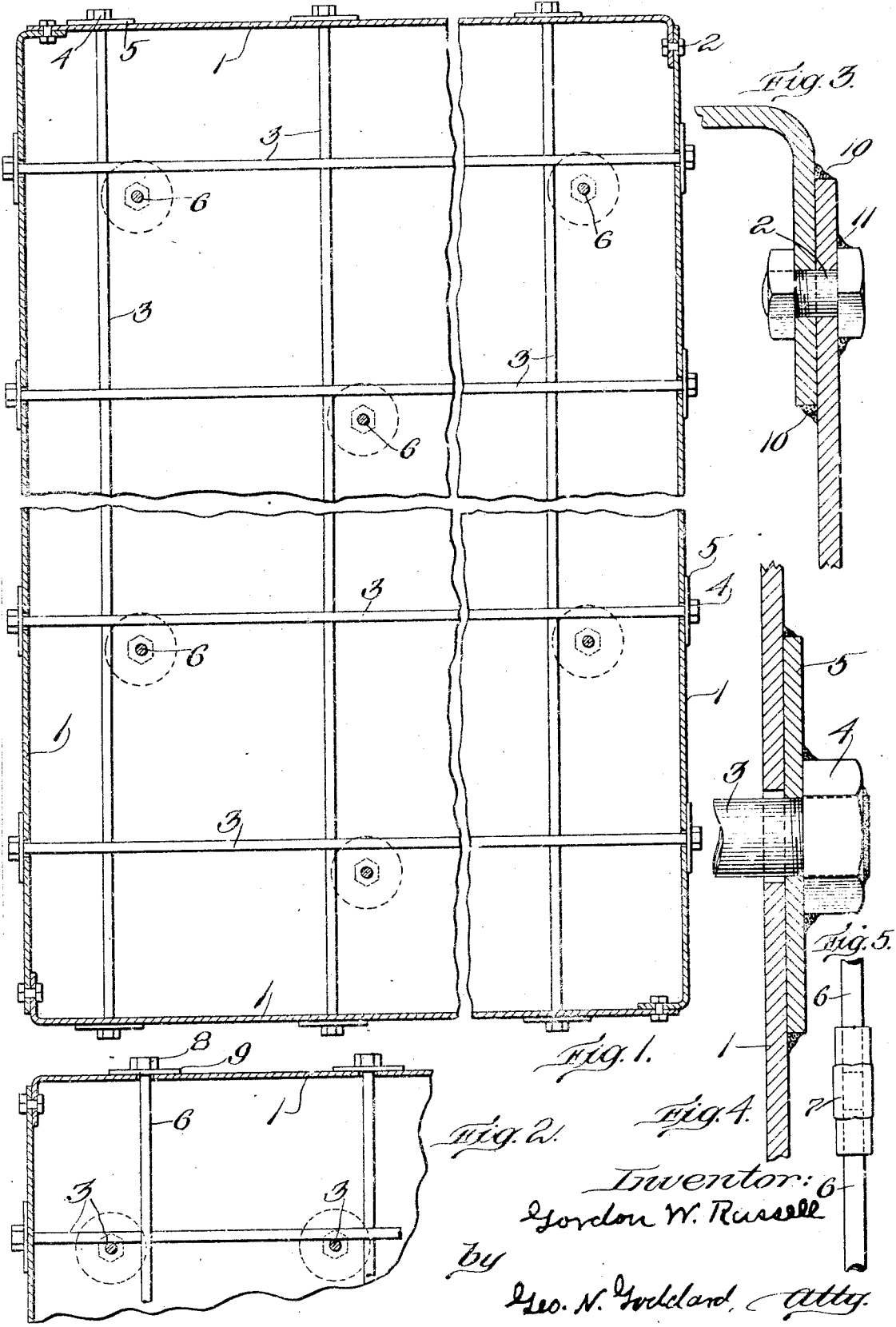

1,686,931

UNITED STATES PATENT OFFICE.

GORDON W. RUSSELL, OF BROOKLINE, MASSACHUSETTS, ASSIGNOR, BY MESNE ASSIGNMENTS, TO JOHANNES KJEKSTAD, OF BROOKLYN, NEW YORK.

PRESSURE-RESISTING STORAGE TANK.

Application filed May 4, 1923. Serial No. 636,577.

This invention relates to storage tanks and is particularly intended to provide a construction for large tanks that are subjected to considerable internal pressure that will adequately sustain such pressure, and at the same time be wholly tight or leak-proof while leaving all parts of the tank accessible to a workman in spite of the use of numerous stay rods to support the walls against buckling and pressure.

In large storage tanks for containing oil and the like it has become the practice to require that such tanks shall be capable of sustaining a substantial internal pressure while it is important, for practical reasons, and to facilitate assemblage of the tank, that a workman shall be able to get access to all portions of the interior and that leakage shall be wholly prevented.

With these ends in view I have devised a principle of construction and arrangement by which the walls are staid by stay rods running through the tank in such arrangement as will afford complete accessibility for a workman to all parts, while effectively preventing leakage through the numerous joints rendered necessary by the stay rod construction used.

These features of the invention will be explained in the following specification and will be defined in the claims hereto annexed.

In the accompanying drawings I have illustrated a construction of tank embodying the principles of this invention, in which:

Figure 1 is a horizontal section through a rectangular tank formed of metal plates reenforced with horizontal and vertical stay rods according to this invention, the walls of the rods being intermediately broken away to allow illustration on a larger scale.

Figure 2 is a vertical section illustrating an upper corner of the tank as constructed.

Figure 3 is a detail view illustrating the provision made for preventing leakage around the joints of a lap seam.

Figure 4 is a similar view showing how the joints formed by the wall-penetrating stay rods are rendered proof against leakage.

Figure 5 is a detail view illustrating the sectional character of the vertical stay rods.

In the practice of this invention, according to the form illustrated in the drawings, the tank of any desired shape and dimensions is built up of plates 1, of any convenient size whose adjacent edges are overlapped and fastened together by short bolts 2 passed through the overlapped edge portions of adjacent plates and serving to hold them together.

The opposite vertical walls are tied together to prevent outward buckling by means of stay rods 3 of a length to project through aligned apertures in the opposite side walls of the tank, and having screwed on their ends suitable retaining nuts 4 which clamp in large washers 5 firmly against the outside faces of the wall plates 1. These horizontal stay rods 3 are arranged say approximately two feet apart, and the longitudinal rods intersecting the cross rods at substantially right angles and being placed at approximately the same level so as to form a series of horizontal skeleton grids spaced sufficiently apart in a vertical direction from one another to permit a man to pass between them.

The vertical stay rods 6, are preferably made in two sections with their ends adjustably connected together by turn buckles 7. The vertical stay rods have their outer ends also screw threaded to receive holding nuts 8 which are tightened against large washers 9 through which the rods pass in order to distribute the stresses over a substantial area around the stay wall apertures.

It will be observed that the vertical stay rods are located in the corner of each square formed by the intersecting horizontal stay rods, there being in this case one such vertical stay rod for each square in the horizontal lattice or grid construction. This arrangement is important because it affords adequate means for staying the top and bottom walls of the tank while not preventing a workman from crawling or climbing into all parts of the tank.

Such a construction as that above described would, of course, be very subject to leakage on account of the numerous joints. Accordingly the edges or cracks around each joint whether of the overlapped plates, as shown at 10 in Figure 3, or around the head of the bolt as shown at 11 in Figure 3, are sealed by causing a deposit or flow of metal sufficient to seal the joint by means of a welding process, preferably electric welding.

In the same manner the bolt heads or nuts 8 and the washers 9, are integrally united with each other and with the wall plates, as shown in Figure 4, to prevent any possible leakage.

The vertical stay rods are made in sections drawn together by turn buckles in order to facilitate their assemblage in the tank.

By the above described arrangement of the tie rods and by electrically welding the tie rod head or nuts and their washers so as to seal each tie rod joint and each lapped seam of the plates, the whole tank is made absolutely tight and free from leakage and is rendered capable of sustaining any required degree of internal pressure without buckling.

The characteristic feature of the stay rod construction, therefore, resides in the employment of stay rods arranged in three series of rows each perpendicular to the other, the rods of each row being spaced apart from one another and being arranged in close proximity to the rods of another row, one series of stay rods, usually the vertical series, being made in sections coupled together by turn buckles or the like.

What I claim is:

1. A storage tank embracing in its construction top, bottom and side walls comprising plates tightly secured together, and a series of stay rods arranged in horizontal groups at different levels, each group comprising two angularly disposed rows of rods arranged in closely adjacent planes and anchored to opposed walls to sustain outward pressure, and series of vertical stay rods anchored to the top and bottom walls and arranged in close proximity to one or both rows of rods comprising the horizontal groups, whereby the whole interior of the tank is rendered accessible when the stay rods are in place, substantially as described.

2. A storage tank embracing in its construction top, bottom and side walls, horizontal rows of horizontal stay rods arranged at different levels in the tank, adjacent cross rods arranged in rows that are adjacent to the corresponding rows of horizontal rods, and vertical stay rods arranged in rows adjacent to one or both sets of horizontal stay rods, whereby one may gain access to the whole interior of the tank when the stay rods are in position, each set of stay rods being anchored to opposed walls to prevent outward buckling and prevent leakage around said stay rods, substantially as described.

3. A storage tank embracing in its construction top, bottom and side walls, opposed walls being anchored against buckling by stay rods, said stay rods being arranged in three series of rows each perpendicular to the other, the rods of each row being spaced apart and being arranged in close proximity to the rods of another row, the rods of one series being made in sections whose adjacent ends are adjustably coupled together by turn buckles, substantially as described.

4. A storage tank embracing in its construction top, bottom and side walls, three sets of stay rods arranged so that each set is substantially perpendicular to the others, the rods of each set being well spaced apart but arranged in proximity to the rods of one or both of the other sets, the vertical rods being made in sections coupled together and all rods being anchored to hold opposed walls against outward pressure, substantially as described.

In witness whereof, I have subscribed the above specification.

GORDON W. RUSSELL.